United States Patent
Kim et al.

(10) Patent No.: US 12,432,595 B2
(45) Date of Patent: Sep. 30, 2025

(54) METHOD FOR SUPPORTING WLAN USE EXPERIENCE ANALYSIS USING UE WLAN USER DATA

(71) Applicant: LG Electronics Inc., Seoul (KR)

(72) Inventors: Jaehyu Kim, Seoul (KR); Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 17/925,803

(22) PCT Filed: Apr. 6, 2021

(86) PCT No.: PCT/KR2021/004241
§ 371 (c)(1),
(2) Date: Nov. 16, 2022

(87) PCT Pub. No.: WO2021/235684
PCT Pub. Date: Nov. 25, 2021

(65) Prior Publication Data
US 2023/0300651 A1 Sep. 21, 2023

(30) Foreign Application Priority Data
May 18, 2020 (KR) .................. 10-2020-0059315

(51) Int. Cl.
*H04W 24/10* (2009.01)
*H04M 15/00* (2006.01)
(Continued)

(52) U.S. Cl.
CPC ........... *H04W 24/10* (2013.01); *H04M 15/66* (2013.01); *H04W 48/18* (2013.01); *H04W 84/12* (2013.01)

(58) Field of Classification Search
CPC ................................ H04L 12/28; H04L 12/50
(Continued)

(56) References Cited

U.S. PATENT DOCUMENTS

2020/0045559 A1 2/2020 Kim et al.
2024/0080704 A1* 3/2024 Feder .................. H04L 47/2425

FOREIGN PATENT DOCUMENTS

WO WO2019174115 9/2019
WO WO2020014214 1/2020
WO WO2020061314 3/2020

OTHER PUBLICATIONS

3GPP, "3rd Generation Partnership Project; Technical Specification Group Services and System Aspects; Architecture enhancements for 5G System (5GS) to support network data analytics services (Release 16)," TS 23.288 V16.3.0, Mar. 2020, 62 pages.

(Continued)

*Primary Examiner* — Dang T Ton
(74) *Attorney, Agent, or Firm* — Fish & Richardson P.C.

(57) ABSTRACT

Provided are a method for supporting wireless local area network (WLAN) use experience analysis using user equipment (UE) WLAN user data, and device supporting the same. A policy and charging function (PCF) operating in a wireless communication system: requests analytics information relating to a WLAN from a network data analytics function (NWDAF); receives analytics information relating to the WLAN from the NWDAF in response to the request; and updates a WLAN selection policy on the basis of the analytics information relating to the WLAN.

15 Claims, 9 Drawing Sheets

(51) Int. Cl.
*H04W 48/18* (2009.01)
*H04W 84/12* (2009.01)

(58) Field of Classification Search
USPC .......................................... 370/329, 402, 404
See application file for complete search history.

(56) References Cited

OTHER PUBLICATIONS

3GPP, "3rd Generation Partnership Project; Technical Specification Group Services and System Aspects; Policy and charging control framework for the 5G System (5GS); Stage 2 (Release 16)," TS 23.503 V16.4.1, Apr. 2020, 115 pages.

* cited by examiner

METHOD FOR SUPPORTING WLAN USE EXPERIENCE ANALYSIS USING UE WLAN USER DATA

CROSS-REFERENCE TO RELATED APPLICATIONS

This application is a National Stage application under 35 U.S.C. § 371 of International Application No. PCT/KR2021/004241, filed on Apr. 6, 2021, which claims the benefit of Korean Patent Application No. 10-2020-0059315, filed on May 18, 2020. The disclosures of the prior applications are incorporated by reference in their entirety.

TECHNICAL FIELD

The present disclosure relates to a method for supporting WLAN usage experience analysis using user equipment (UE) wireless local area network (WLAN) user data.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A user equipment (UE) may select a wireless local area network (WLAN) access network using an access network discovery and a selection policy. The selected WLAN access network may be used for registration with 5GC using traffic offload (i.e., sending traffic to the WLAN outside the protocol data unit (PDU) session) and non-3GPP access network selection information.

SUMMARY

It may be necessary to utilize the actual WLAN usage data of the UE to support the analysis of the WLAN usage experience, and to consider it in the access network selection and selection policy.

In an aspect, a method performed by a policy and charging function (PCF) operating in a wireless communication system is provided. The method includes transmitting, to a network data analytics function (NWDAF), a request for analytics related to a WLAN, receiving, from the NWDAF, the analytics related to the WLAN in response to the request, and updating a WLAN selection policy based on the analytics related to the WLAN.

In another aspect, a method performed by a user equipment (UE) operating in wireless communication system is provided. The method includes collecting data about wireless local area network (WLAN) usage experience, and transmitting, to a policy and charging function (PCF) or a network function (NF), the collected data about the WLAN usage experience.

In another aspect, an apparatus implementing the above method is provided.

The present disclosure can have various advantageous effects.

For example, the PCF can update the WLANSP to achieve the best WLAN performance by using the new analytics related to the WLAN usage experience.

For example, the PCF can update the WLANSP to continuously reflect the actual UE's WLAN usage experience based on data related to the WLAN usage experience provided by the UE.

For example, NFs other than the PCF can also update WLAN-related configuration based on data related to the WLAN usage experience provided by the UE.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

DETAILED DESCRIPTION

Figure 1:
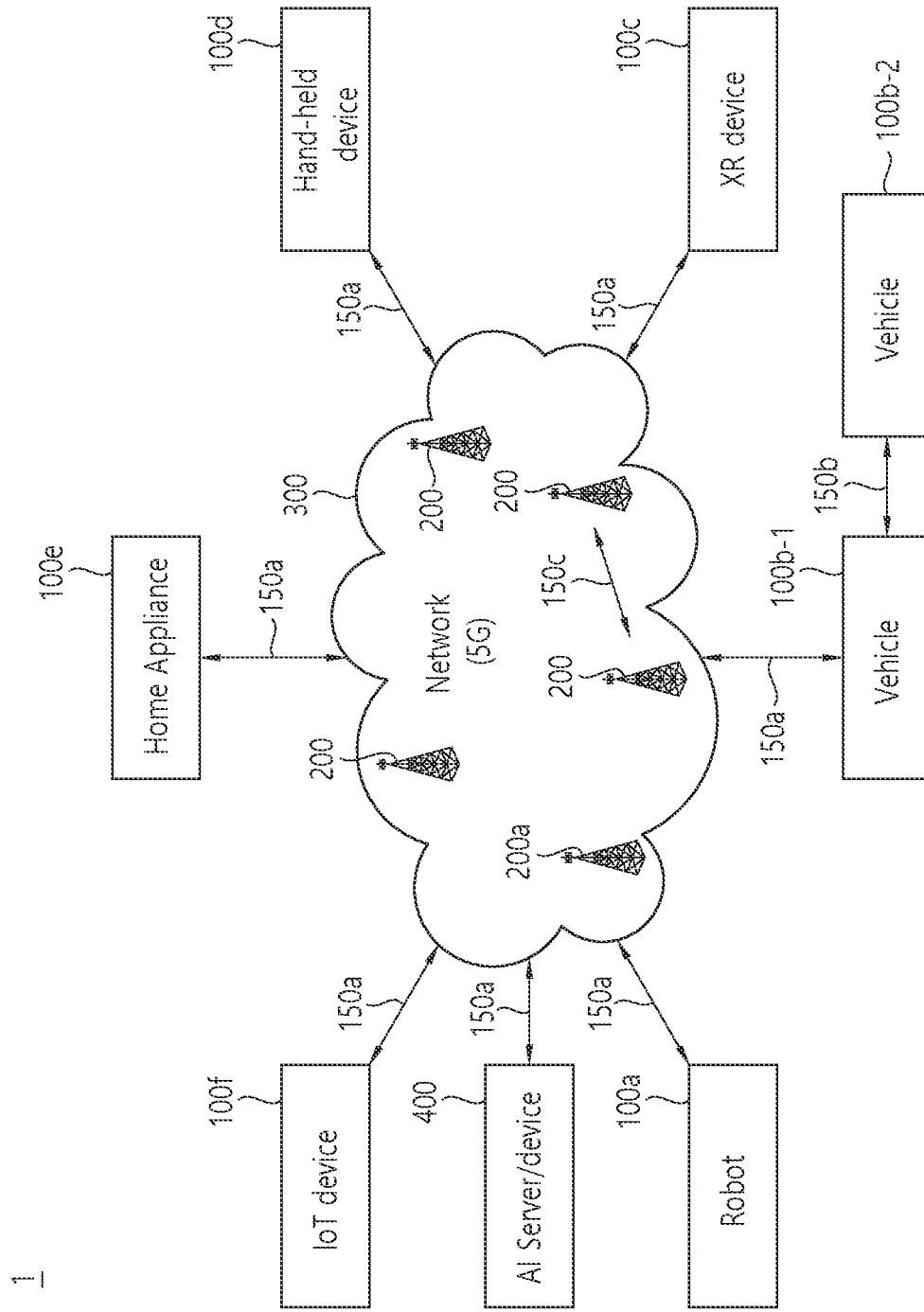
FIG. 1 shows an example of a communication system to which implementations of the present disclosure is applied.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 KHz/60 kHz, dense-urban, lower latency, and wider carrier bandwidth can be supported. If SCS is 60 KHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
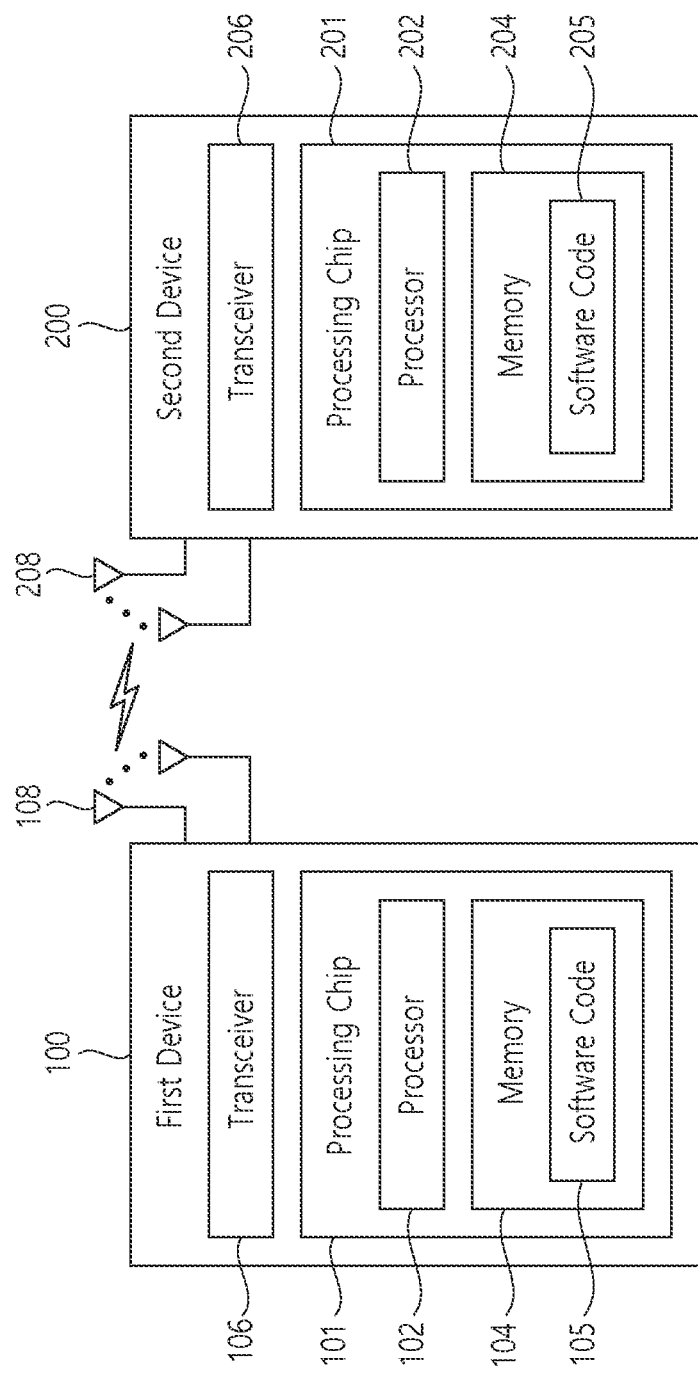
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
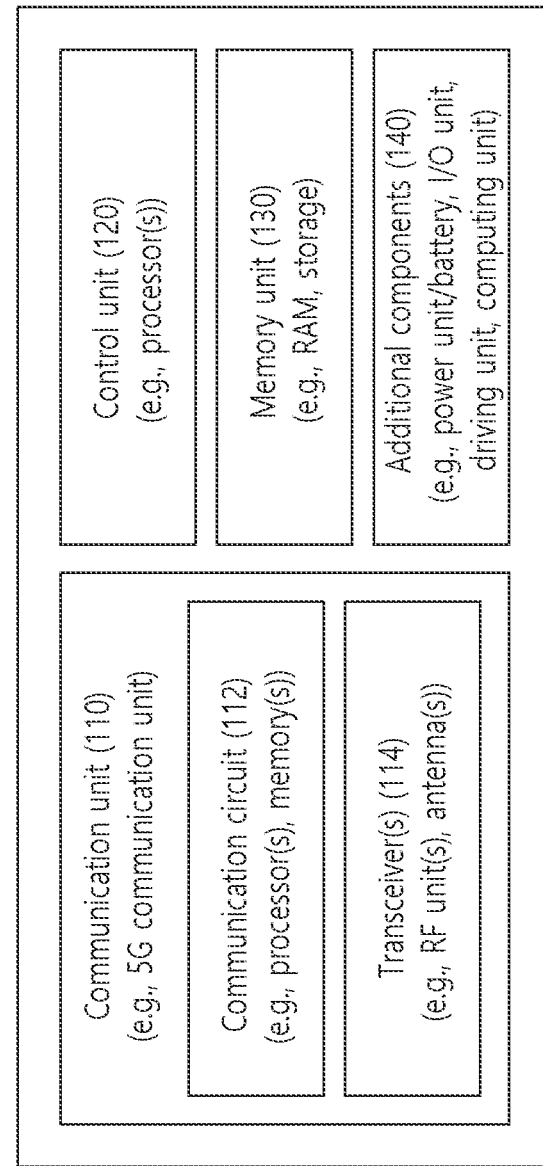
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
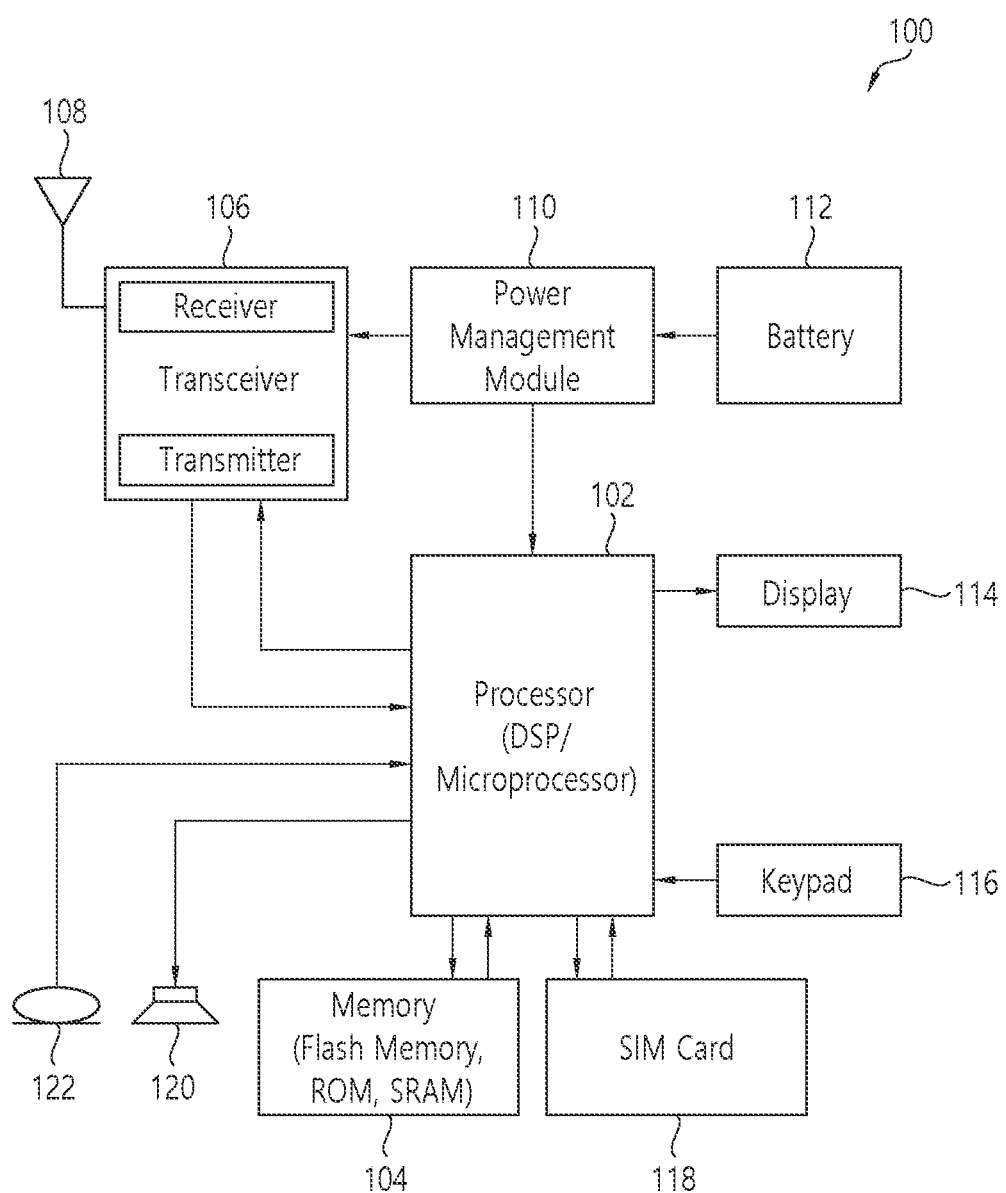
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art. The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
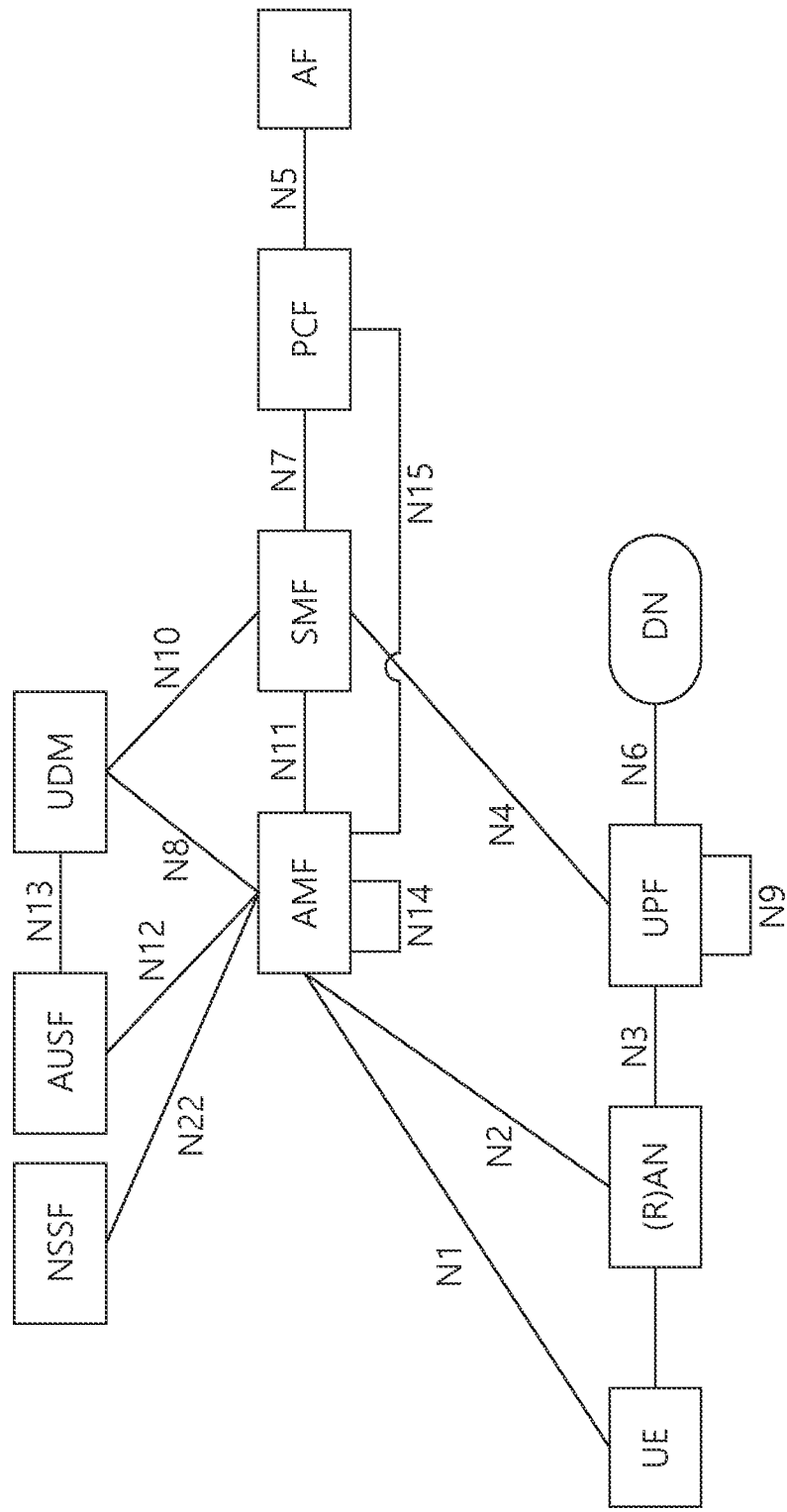
FIG. 5 shows an example of a 5G system architecture to which implementations of the present disclosure is applied.

FIG. 5 shows an example of a 5G system architecture to which implementations of the present disclosure is applied.

The 5G system (5GS; 5G system) structure consists of the following network functions (NFs).
AUSF (Authentication Server Function)
AMF (Access and Mobility Management Function)
DN (Data Network), e.g., operator services, internet access or third-party services
USDF (Unstructured Data Storage Function)
NEF (Network Exposure Function)
I-NEF (Intermediate NEF)
NRF (Network Repository Function)
NSSF (Network Slice Selection Function)
PCF (Policy Control Function)
SMF (Session Management Function)
UDM (Unified Data Management)
UDR (Unified Data Repository)
UPF (User Plane Function)
UCMF (UE radio Capability Management Function)
AF (Application Function)
UE (User Equipment)
(R)AN ((Radio) Access Network)
5G-EIR (5G-Equipment Identity Register)
NWDAF (Network Data Analytics Function)
CHF (Charging Function)
In addition, the following network functions may be considered.
N3IWF (Non-3GPP InterWorking Function)
TNGF (Trusted Non-3GPP Gateway Function)
W-AGF (Wireline Access Gateway Function)

FIG. 5 shows the 5G system structure of a non-roaming case using a reference point representation that shows how various network functions interact with each other.

In FIG. 5, UDSF, NEF and NRF are not described for clarity of the point-to-point diagram. However, all network functions shown may interact with UDSF, UDR, NEF and NRF as needed.

For clarity, the connection between the UDR and other NFs (e.g., PCFs) is not shown in FIG. 5. For clarity, the connection between NWDAF and other NFs (e.g. PCFs) is not shown in FIG. 5.

The 5G system architecture includes the following reference points.
N1: the reference point between the UE and the AMF.
N2: reference point between (R)AN and AMF.
N3: Reference point between (R)AN and UPF.
N4: reference point between SMF and UPF.
N6: Reference point between UPF and data network.
N9: reference point between two UPFs.
The following reference points show the interactions that exist between NF services in NF.
N5: Reference point between PCF and AF.
N7: reference point between SMF and PCF.
N8: reference point between UDM and AMF.
N10: reference point between UDM and SMF.
N11: reference point between AMF and SMF.
N12: reference point between AMF and AUSF.
N13: reference point between UDM and AUSF.
N14: reference point between two AMFs.
N15: Reference point between PCF and AMF in case of non-roaming scenario, and reference point between PCF and AMF of visited network in case of roaming scenario.
N16: reference point between two SMFs (in case of roaming, between the SMF of the visited network and the SMF of the home network)
N22: reference point between AMF and NSSF.

In some cases, it may be necessary to connect two NFs to each other to service the UE.

NWDAF is described. Sections 4 and 5 of 3GPP TS 23.288 V16.3.0 can be referred.

The NWDAF is part of the 5G system architecture exemplarily described in FIG. 5. The NWDAF interacts with different entities for different purposes.

Data collection based on subscription to events provided by AMF, SMF, PCF, UDM, AF (directly or via NEF), and Operation Administration Maintenance (OAM);

Retrieval of information from data repositories (e.g., UDR via UDM for subscriber-related information);

Retrieval of information about NFs (e.g., from NRF for NF-related information);

On demand provision of analytics to consumers.

A single instance or multiple instances of NWDAF may be deployed in a public land mobile network (PLMN). If multiple NWDAF instances are deployed, the 5G system architecture supports deploying the NWDAF as a central NF, as a collection of distributed NFs, or as a combination of both.

When multiple NWDAFs exist, not all of them need to be able to provide the same type of analytics results, i.e., some of them can be specialized in providing certain types of analytics. An analytics ID information element (IE) is used to identify the type of supported analytics that NWDAF can generate.

NWDAF instance can be collocated with a 5GS NF.

The 5G system architecture allows the NWDAF to collect data from any 5GC NF. The NWDAF belongs to the same PLMN as the 5GC NF that provides the data.

The Nnf interface is defined for the NWDAF to request subscription to data delivery for a particular context, to cancel subscription to data delivery and to request a specific report of data for a particular context.

The 5G system architecture allows the NWDAF to retrieve the management data from the OAM by invoking OAM services.

In addition, the 5G system architecture allows any 5GC NF to request network analytics information from the NWDAF. The NWDAF belongs to the same PLMN as the 5GC NF that consumes the analytics information.

The Nnwdaf interface is defined for 5GC NFs, to request subscription to network analytics delivery for a particular context, to cancel subscription to network analytics delivery and to request a specific report of network analytics for a particular context.

The NWDAF provides analytics to 5GC NFs, and OAM.

Analytics information are either statistical information of the past events, or predictive information.

Different NWDAF instances may be present in the 5GC, with possible specializations per type of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of analytics ID(s) that it supports when registering to the NRF, in addition to other NRF registration elements of the NF profile. Other NFs requiring the discovery of an NWDAF instance that provides support for some specific type of analytics may query the NRF and include the analytics ID(s) that identifies the desired type of analytics for that purpose.

The consumers, i.e., 5GC NFs and OAM, decide how to use the data analytics provided by NWDAF.

The interactions between 5GC NF and the NWDAF take place within a PLMN.

The NWDAF has no knowledge about NF application logic. The NWDAF may use subscription data but only for statistical purpose.

The NWDAF service consumer selects an NWDAF that supports requested analytics information by using the NWDAF discovery principles.

Enhancement of the NWDAF are under discussion to enable 5GS to support network automation.

One of the major issues in the discussion of enhancement of the NWDAF is UE data as an input for analytics generation. This issue addresses whether and how to enhance the NWDAF to support collection and utilization of data provided by the UE in order to provide input information to generate analytics information (to be consumed by other NFs).

In relation to this issue, the following may be discussed.

What type of information from the UE could be collected by the network (e.g., NWDAF) as input for analytics generation?

What types of analytics information could be provided by the NWDAF to other NEs to leverage the data provided by the UE?

How frequently such data provided by the UE are to be shared with the NWDAF?

What are the triggers for the UE to provide data to the NWDAF as input for analytics?

How to ensure the integrity and operator-level accessibility of UE-provided information in order to avoid using misleading or untrusted information in the network?

Whether there are privacy aspects that need to be considered, i.e., related to the information provided by the UE? If so, how to ensure privacy on collection and utilization of UE data?

How the NWDAF collects the UE's information (i.e., the method of collection of data)?

Access network discovery and selection policy information is described. Section 6.6.1 of 3GPP TS 23.503 V16.4.1 can be referred.

The access network discovery and selection policy is an optional policy that may be provided to UE by the network.

The wireless local area network (WLAN) access network selected by the UE with the use of access network discovery and selection policy may be used for direct traffic offload (i.e., sending traffic to the WLAN outside of a PDU session) and for registering to 5GC using the non-3GPP access network selection information.

If the UE supports non-3GPP access to 5GC, it shall support access network discovery and selection policy.

The access network discovery and selection policy include one or more WLAN selection policy (WLANSP) rules. A WLANSP (or WLANSP rule) is a set of operator-defined rules that determine how the UE (re-)selects a WLAN access network. According to the WLANSP rule, the UE selects the most prioritized available WLAN and connects to it. The priority of each WLAN is determined by several attributes (e.g., MinBackhaulThreshold, BSSLoad).

The access network discovery and selection policy may include information to select evolved packet data gateway (ePDG) or N3IWF by the UE.

The UE may be provisioned with multiple valid WLANSP rules (by the home PLMN (HPLMN) and by the visited PLMN (VPLMN) when the UE is roaming). A WLANSP rule is valid if it meets the validity conditions included in the WLANSP rule (if provided).

When the UE is in the home, the UE uses the valid WLANSP rules from the HPLMN to select an available WLAN. When the UE is roaming and the UE has valid rules from both HPLMN and VPLMN, the UE gives priority to the valid WLANSP rules from the VPLMN.

A UE procedure for selecting a WLAN access network based on WLANSP rules is as follows.

When the UE has valid 3GPP subscription credentials (e.g., a valid USIM) and WLANSP rules, the UE performs WLAN selection based on these rules, and the applicable User Preferences On Non-3GPP Access Selection. User Preferences On Non-3GPP Access Selection take precedence over the WLANSP rules.

The UE determines the most preferred WLAN access network using WLANSP rules, when a WLAN access network cannot be selected based on User Preferences On Non-3GPP Access Selection (e.g., when there are no User Preferences On Non-3GPP Access Selection or when there is no user-preferred WLAN access network available).

The UB constructs a prioritized list of the available WLANs by discovering the available WLANs and comparing their attributes/capabilities against the groups of selection criteria in the valid WLANSP rule(s). When there are multiple valid WLANSP rules, the UE evaluates the valid WLANSP rules in priority order. The UE evaluates first if an available WLAN access meets the criteria of the highest priority valid WLANSP rule. The UE then evaluates if an available WLAN access meets the selection criteria of the next priority valid WLANSP rule.

Within a valid WLANSP rule, the WLAN(s) that match the group of selection criteria with the highest priority are considered as the most preferred WLANs, the WLAN(s) that match the group of selection criteria with the second highest priority are considered as the second most preferred WLANs, etc.

When a group of selection criteria includes the HomeNetwork attribute and is set, then the UE (a) creates a list of available WLANs that directly interwork with the home operator, and (b) applies the group of selection criteria to all the WLANs in this list. Otherwise, when the HomeNetwork attribute is not set or is not present, the UE applies the group of selection criteria to all available WLANs. The UE may need to perform ANQP procedures or other procedures in order to discover the attributes/capabilities of the available WLANs.

When the UE is roaming, the UE may have valid WLANSP rules from both the VPLMN and the HPLMN. In such a case, the UE gives priority to the valid WLANSP rules from the VPLMN. The UE constructs a prioritized list of the available WLANs when the available WLAN accesses meet the selection criteria of the valid rules from the VPLMN and the valid rules from the HPLMN. The prioritized WLAN accesses based on the WLANSP rules from the HPLMN has lower priority from the prioritized list of WLAN access based on the WLANSP rules of the VPLMN.

As described above, the WLANSP rules include criteria that the UE may consider when selecting a WLAN access network to connect. The WLANSP rules may be created by the PCF. However, when the PCF generates the WLANSP rules, the actual WLAN usage experience of the UE may not be reflected. That is, in the process of the PCF generating the WLANSP rule, whether the WLAN selected by the UE satisfies any of several criteria and/or the performance of the WLAN selected through this may not be considered. As a result, the priority of the WLAN determined by the UE based on the WLANSP rules does not reflect the actual WLAN usage experience of the UE, and accordingly, the WLAN with the highest priority may not provide the best performance to the UE.

According to implementations of the present disclosure, a method for improving by utilizing the WLAN usage data provided by the UE in creating/modifying the WLANSP rules may be proposed.

(1) According to implementations of the present disclosure, the PCF may provide data collection configuration information to the UE so that the UE may collect data related to the WLAN usage experience. The data collection configuration information may include information about the type of data needs to be collected by the UE, the time interval for collecting data, and/or when to transmit the collected (e.g., WLAN disconnection, change of WLAN/service set ID (SSID), etc.).

Also, the PCF may provide a WLANSP to the UE. That is, the data related to the WLAN usage experience to be collected by the UE may be data related to the WLANSP.

(2) According to implementations of the present disclosure, the UE may collect/generate data related to WLAN usage experience. The UE may collect/generate data related to WLAN usage experience based on the received data collection configuration information.

Table 3 shows an example of data related to the WLAN usage experience collected/generated by the UE. The UE may collect/generate all or part of the data related to the WLAN usage experience disclosed in Table 3. The UE may generate every data slot for every time interval.

TABLE 3

| Information | Description |
| --- | --- |
| UE ID | Subscription permanent ID (SUPI) |
| SSID | SSID of WLAN AP to which UE connects |
| List of collected UE data slots (1 . . . max) | Each slot contains accumulated or average value measured over a time interval |
| BSSID | SSID of WLAN AP to which UE connects |
| UE location | UE location information where the UE connects to the WLAN (e.g. Cell ID, TAI, geo coordinate) |
| Backhaul bandwidth | Backhaul bandwidth of WLAN to which UE connects |
| BSS load | Average BSS load of WLAN to which UE connects |
| WLAN Protocol | MAC and PHY protocols of WLAN (e.g., 802.11 n, 802.11 ac) |
| Start time of data collection | Start time of data collection |
| End time of data collection | End time of data collection |
| Packet loss | The observed number of packet loss |
| Packet re-transmission | The observed number of packet retransmission |
| Latency | Average latency |
| Throughput | Average throughput |
| RSSI | Average received signal strength indicator (RSSI) |
| SNR | Average signal-to-noise ratio (SNR) |

The data related to the WLAN usage experience disclosed in Table 3 is merely an example. In addition, the UE may collect/generate data or other types of information related to the WLAN usage experience not disclosed in Table 3. For example, which WLANSP was applied, what selection criteria were applied to select an available WLAN, and by what criteria the WLAN determined to be unavailable was determined to be unavailable (e.g., MinBackhaulThreshold, MaxBSSLoad, etc.), information about other WLANs that have been determined to be available and included in the priority list of available WLANs but have not been selected, and/or supported or specified security protocols (e.g., WPA3, WPA2, etc.) may be additionally collected/created.

The UE may transmit all or part of the collected/generated data to the PCF or other NF. Another NF may be an NF (e.g., NWDAF) responsible for collecting UE data. The UE may decide when to transmit the collected/generated data based on the data collection configuration information (e.g., whenever a specific event occurs). When the UE transmits the collected/generated data, the UE may transmit together with the PLMN ID for which PLMN to transmit. The PLMN ID may be a PLMN ID that generates/provides a WLANSP applied when the UE selects a WLAN.

(3) According to implementations of the present disclosure, the NWDAF may collect data related to the WLAN usage experience provided by the UE, and may generate newly defined WLAN usage experience analytics. New analytics related to the WLAN usage experience may include a correlation between the WLANSP generated by the PCF and the performance of the WLAN connected to the UE based on the WLANSP.

Depending on the analytics target period, the WLAN usage experience analytics may include statistics and/or predictions.

Table 4 shows an example of statistics for WLAN usage experience analytics generated by the NWDAF. The NWDAF may generate all or some of the statistics disclosed in Table 4.

TABLE 4

| Information | Description |
| --- | --- |
| Area of Interest | A list of TAIs or Cell Ids |
| Preferred SSID List | A prioritized list of SSIDs preferred for selection |
| List of Analytics per SSID | SSIDs of WLAN APs deployed in the Area of Interest |
| WLAN Protocol | MAC and PHY protocols of WLAN (e.g., 802.11 n, 802.11 ac) |
| Backhaul bandwidth | Backhaul bandwidth value |
| BSS load | Average BSS load |
| Packet loss | The number of packet loss |
| Packet re-transmission | The number of packet retransmission |
| Latency | Average latency |
| Throughput | Average throughput |
| RSSI | Average RSSI |
| SNR | Average SNR |
| Number of UEs | Number of UEs observed for the SSID |

Table 5 shows an example of predictions for WLAN usage experience analytics generated by the NWDAF. The NWDAF may generate all or part of the predictions disclosed in Table 5.

TABLE 5

| Information | Description |
| --- | --- |
| Area of Interest | A list of TAIs or Cell Ids |
| Preferred SSID List | A prioritized list of SSIDs preferred for selection |
| List of Analytics per SSID | SSIDs of WLAN access points deployed in Area of Interest |
| WLAN Protocol | MAC and PHY protocols of WLAN (e.g., 802.11 n, 802.11 ac) |
| Backhaul bandwidth | Predicted Backhaul bandwidth value |
| BSS load | Predicted Average BSS load |
| Packet loss | Predicted number of packet loss |
| Packet re-transmission | Predicted number of packet retransmission |
| Latency | Predicted average latency |
| Throughput | Predicted average throughput |
| RSSI | Predicted average RSSI |
| SNR | Predicted average SNR |
| Number of UEs | Number of UEs predicted for the SSID |
| Confidence | Confidence of the prediction |

Statistics for WLAN usage experience analytics disclosed in Table 4 and/or predictions for WLAN usage experience analytics disclosed in Table 5 are merely examples. In addition, the NWDAF may generate statistics and/or predictions not disclosed in Table 4 and/or Table 5. For example, the frequency with which each WLANSP and/or selection criterion is applied to the UE, the WLANSP and/or selection criterion that needs to be updated to improve performance, the characteristics of the selection criterion that needs to be updated and its value (e.g., MaximumBSSLoad=60, MinimumBackhaulThreshold=2 Mbps in the downlink, etc.) may be additionally generated.

(4) According to implementations of the present disclosure, the NWDAF may provide the generated WLAN usage experience analytics to the PCF or another NF. The NWDAF may provide the generated WLAN usage experience analytics to the requesting PCF or other NF.

For example, the NWDAF may provide the generated WLAN usage experience analytics to the PCF, and the PCF may utilize it to update and/or improve the existing WLANSP so that the UE can select an optimal WLAN. For example, set values such as MaximumBSSLoad and MinimumBackhaul Threshold that may be included in the selection criteria of the WLANSP and/or location, valid time conditions, etc., may be updated and/or modified.

A consumer (e.g., PCF) of the WLAN usage experience analytics may indicate the following to the NWDAF when in the request and/or subscription to the WLAN usage experience analytics.

Analytics ID set to "WLAN Usage Experience"

Target of analytics reporting: a UE, a group of UEs, or any UE

Analytics filter information: may include at least one of area of interest (TA list, cell list, PLMN, etc.), SSID, and BSSID Analytics target period: the time period over which the statistics or prediction are requested, either in the past or in the future.

The above information is merely an example, and in addition, various parameters may be included in the request and/or subscription.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 6:
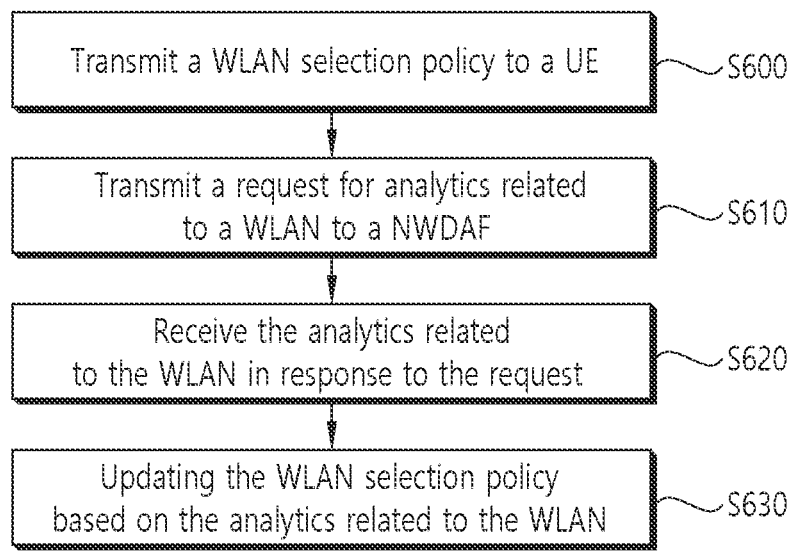
FIG. 6 shows an example of a method performed by a PCF to which implementations of the present disclosure is applied.

FIG. 6 shows an example of a method performed by a PCF to which implementations of the present disclosure is applied.

In step S600, the PCF transmits, to a UE, a policy for WLAN selection (e.g., WLANSP).

In step S610, the PCF transmits, to a NWDAF, a request for analytics related to a WLAN In some implementations, the PCF may further transmit, to the UE, a configuration for collecting data related to the WLAN. The configuration may include at least one of a type of data to be collected by the UE, information about a time interval during which the UE collects the data, or information about when the UE transmits the collected data.

In step S620, the PCF receives, from the NWDAF, the analytics related to the WLAN in response to the request.

In some implementations, the analytics related to the WLAN includes a correlation between the policy for the WLAN selection and performance of WLAN connected to the UE.

In some implementations, the analytics related to the WLAN includes at least one of statistical information about past and prediction information about future.

In some implementations, transmitting the request for the analytics related to the WLAN may comprise subscribing to the analytics related to the WLAN. The request for the analytics related to the WLAN may include at least one of an analytics ID set to "WLAN Usage Experience" or "WLAN performance", target of analytics reporting, analytics filter information, or analytics target period.

In step S630, the PCF updates the policy for the WLAN selection based on the analytics related to the WLAN.

Figure 7:
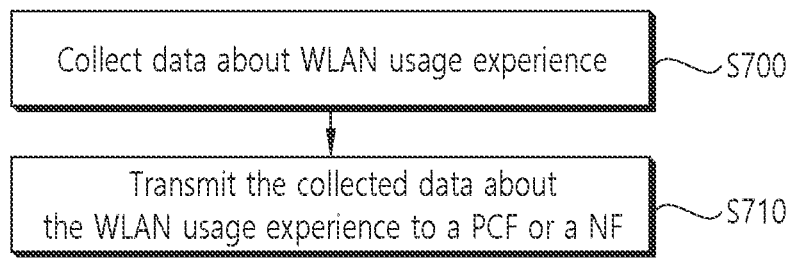
FIG. 7 shows an example of a method performed by a UE to which implementations of the present disclosure is applied.

FIG. 7 shows an example of a method performed by a UE to which implementations of the present disclosure is applied.

In step S700, the UE collects data about WLAN usage experience.

In some implementations, the data about the WLAN usage experience may include data related to a WLAN located in a specific area of interest and/or data related to a specific SSID.

In step S710, the UE transmits, to a PCF or a NF, the collected data about the WLAN usage experience.

In some implementations, the NF may be a NWDAF.

In some implementations, the UE may determine when to transmit the collected data on the WLAN usage experience.

In some implementations, an ID of a PLMN to which the collected data on the WLAN usage experience is to be transmitted is transmitted together with the collected data on the WLAN usage experience. The ID of PLMN may be an ID of a PLMN that provides a policy for WLAN selection applied when the UE selects a WLAN.

In some implementations, the UE may communicate with at least one of a mobile device, a network and autonomous vehicle other than the UE.

Furthermore, the method in perspective of the UE described above in FIG. 7 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions to cause the at least one processor to perform operations below.

The operation comprise collecting data about WLAN usage experience.

In some implementations, the data about the WLAN usage experience may include data related to a WLAN located in a specific area of interest and/or data related to a specific SSID.

The operation comprise transmitting, to a PCF or a NF, the collected data about the WLAN usage experience.

In some implementations, the NF may be a NWDAF.

In some implementations, the UE may determine when to transmit the collected data on the WLAN usage experience.

In some implementations, an ID of a PLMN to which the collected data on the WLAN usage experience is to be transmitted is transmitted together with the collected data on the WLAN usage experience. The ID of PLMN may be an ID of a PLMN that provides a policy for WLAN selection applied when the UE selects a WLAN.

Furthermore, the method in perspective of the UE described above in FIG. 7 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system comprises at least one processor, and at least one memory operably connectable to the at least one processor. The at least one processor is adapted to perform operations comprising: collecting data about WLAN usage experience, and controlling the apparatus to transmit, to a PCF or a NF, the collected data about the WLAN usage experience.

Furthermore, the method in perspective of the UE described above in FIG. 7 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions to cause at least one processor to perform operations. The operations comprise: collecting data about WLAN usage experience, and controlling the apparatus to transmit, to a PCF or a NF, the collected data about the WLAN usage experience.

Figure 8:
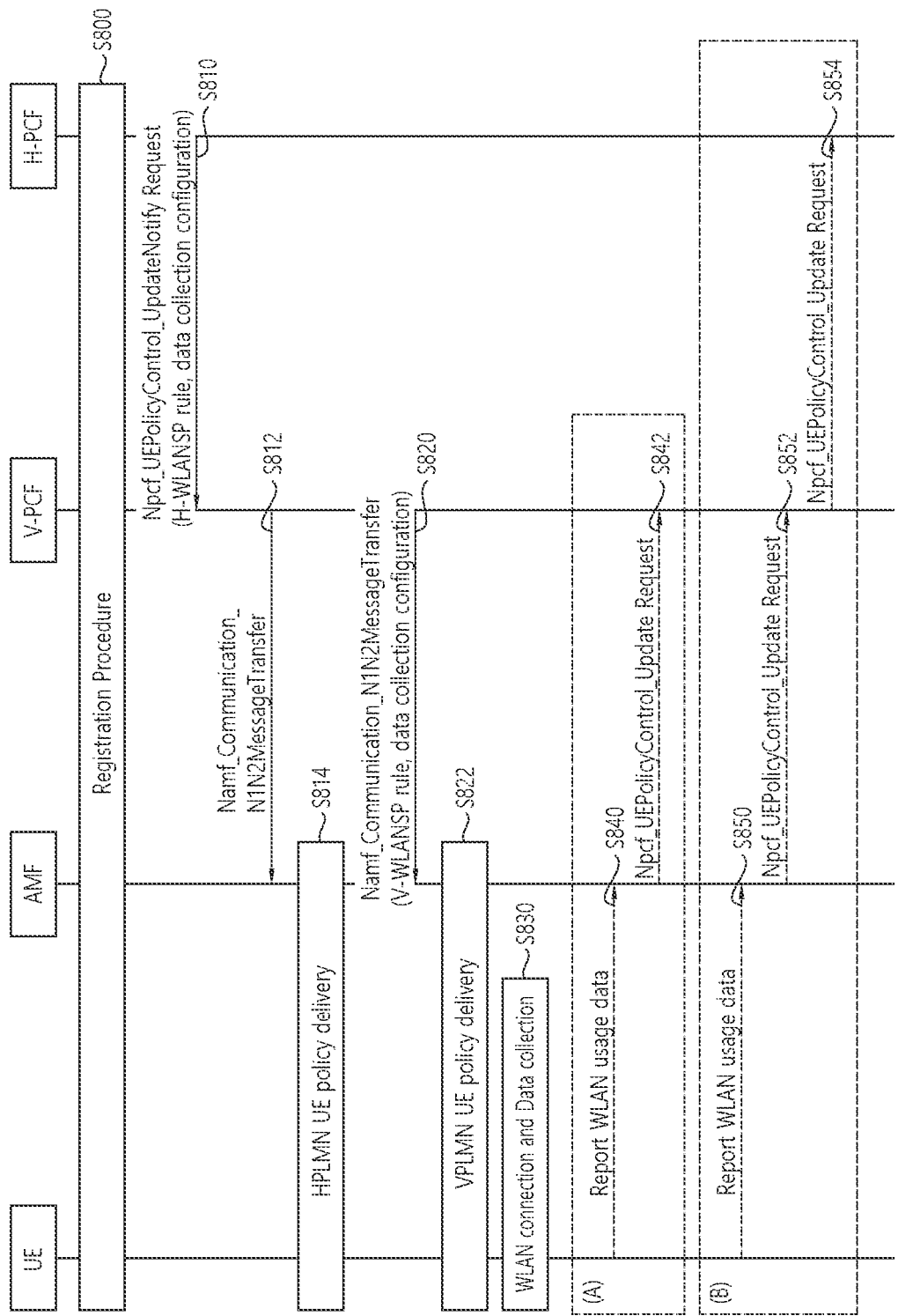
FIG. 8 shows an example of a procedure for collecting data about WLAN usage experience of the UE to which implementation of the present disclosure is applied.

FIG. 8 shows an example of a procedure for collecting data about WLAN usage experience of the UE to which implementation of the present disclosure is applied.

The procedure described in FIG. 8 may be applied to both roaming and non-roaming cases.

In the non-roaming case, the VPLMN PCF (V-PCF) shown in FIG. 8 is not involved. In the roaming case, the AMF interacts with the V-PCF, and the HPLMN PCF (H-PCF) interacts with the V-PCF.

(1) Step S800: The UE performs a registration procedure in 5GC.

(2) Step S810: The H-PCF may provide UE access selection related policy information in UE policy container. The UE access selection related policy information may include WLANSP and/or data collection configuration information. The data collection configuration information may include information about a generation period of a data slot, a type of data to be collected, a data reporting time (e.g., WLAN disconnection, etc.), etc. Detailed information included in the data collection configuration information may be adjusted according to the current situation of the UE (e.g., the current UE location, etc.). In addition, detailed information included in the data collection configuration information may be adjusted according to information included in a subscription request from the NWDAF.

Alternatively, the data collection configuration information may be pre-configured in the UE. The data collection configuration information pre-configured in the UE may be pre-configured in various forms, such as a configuration applied to all PLMNs, a configuration applied in HPLMN, a configuration applied during roaming and a configuration applied to each PLMN.

(3) Step S812: The UE policy container including the UE access selection related policy information is delivered to the AMF via the V-PCF.

(4) Step S814: The AMF delivers the UE policy container generated by the H-PCF to the UE. Accordingly, policy information in the HPLMN may be delivered to the UE.

(5) Step S820: In case of roaming, the V-PCF may provide UE access selection related policy information in UE policy container. The UE access selection related policy information may include WLANSP and/or data collection configuration information. The data collection configuration information may include information about a generation period of a data slot, a type of data to be collected, a data reporting time (e.g., WLAN disconnection, etc.), etc. Detailed information included in the data collection configuration information may be adjusted according to the current situation of the UE (e.g., the current UE location, etc.). In addition, detailed information included in the data collection configuration information may be adjusted according to information included in a subscription request from the NWDAF.

(6) Step S822: The AMF delivers the UE policy container generated by the V-PCF to the UE. Accordingly, policy information in the VPLMN may be delivered to the UE.

(7) Step S830: In case of roaming, the UE may have valid WLANSP received from both the HPLMN and the VPLMN. In this case, the UE gives priority to the WLANSP from the VPLMN. According to a selected WLANSP, the UE selects an available WLAN and connects to it.

Then the UE begins collecting data related to WLAN usage experience following the received data collection configuration information. The UE may collect data related to the WLAN usage experience and create a data slot at every time interval indicated by the data collection configuration information.

(8) Step S840/S842: If the UE applied the WLANSP of the VPLMN to select the WLAN in step S830, then the UE reports the collected data related to the WLAN usage experience with VPLMN ID. Accordingly, the collected data related to the WLAN usage experience can be delivered to the V-PCF.

(9) Step S850/S852/S854: If the UE applied the WLANSP of the HPLMN to select the WLAN in step S830, then the UE reports the collected data related to the WLAN usage experience with HPLMN ID. Accordingly, the collected data related to the WLAN usage experience can be delivered to the H-PCF.

For steps S840 and/or S850, an existing NAS message may be extended and used, or a new NAS message may be defined and used.

Steps S840/S842 and/or S850/S852/S854 may be transmitted over a 3GPP access or may be transmitted over a non-3GPP access.

The data reporting in steps S840 and/or S850 may be triggered whenever an event indicated in the data collection configuration information occurs. The events may include WLAN disconnection, WLAN/SSID change, etc. When data reporting is triggered by the WLAN disconnection, the collected data related to the WLAN usage experience may be transmitted over a 3GPP access. At this time, when the UE enters the CM_CONNECTED state, it may transmit the collected data related to the WLAN usage experience.

Figure 9:
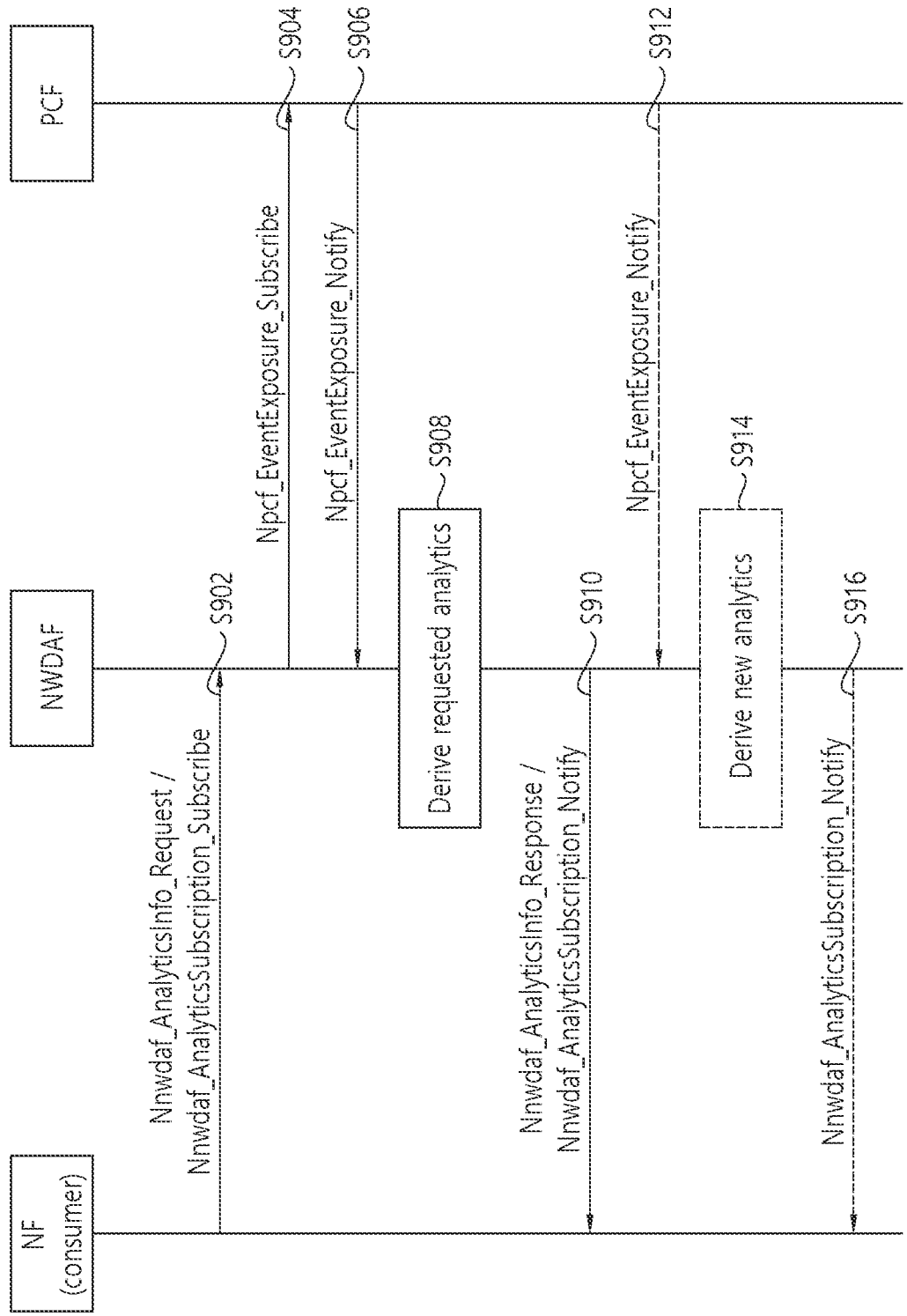
FIG. 9 shows an example of a procedure for requesting/transmitting analytics based on data about WLAN usage experience of the UE to which implementations of the present disclosure is applied.

FIG. 9 shows an example of a procedure for requesting/transmitting analytics based on data about WLAN usage experience of the UE to which implementations of the present disclosure is applied.

(1) Step S902: The NF sends request and/or subscription to the NWDAF for analytics on WLAN usage experience, using either the Nwdaf_AnalyticsInfo or Nnwdaf_AnalyticsSubscription service. At this time, at least one of the following may be indicated.

Analytics ID set to "WLAN Usage Experience"

Target of analytics reporting: a UE, a group of UEs, or any UE

Analytics filter information: may include at least one of area of interest (TA list, cell list, PLMN, etc.), SSID, and BSSID Analytics target period: the time period over which the statistics or prediction are requested, either in the past or in the future.

The above information is merely an example, and in addition, various parameters may be included in the request and/or subscription.

For example, if a request and/or subscription for analytics includes information about an area of interest as the filter information, the NWDAF may derive analytics by utilizing data about WLAN usage experience collected within that area of interest.

For example, if a request and/or subscription for analytics includes an SSID as the filter information, the NWDAF may derive analytics by utilizing data on WLAN usage experiences collected for the SSID.

For example, if the request and/or subscription of analytics includes a UE or a UE group as a target of analytics reporting, the NWDAF may derive the analytics for the UE or UE group. When the request and/or subscription of analytics includes any UE as the target of analytics reporting, the NWDAF may select data to be used for deriving analytics based on the information included in the filter information.

(2) Step S904: If the request is authorized, the NWDAF sends request and/or subscription to all PCFs to collect UE data related to WLANSP.

The NWDAF may select a serving PCF by utilizing the target of analytics reporting and/or the filter information included in the request and/or subscription of the analytics.

The NWDAF may include configuration related to UE data collection in the request and/or subscription. For example, the configuration related to UE data collection may include a type of data to be collected, a collection method (e.g., a data slot generation time interval, etc.), etc. Based on this, the PCF may adjust data collection configuration.

(3) Step S906: The PCF provides stored data related to the WLAN usage experience of the UE collected by the procedure described above in FIG. 8.

(4) Step S908: The NWDAF derives requested analytics based on the obtained data related to the WLAN usage experience of the UE.

(5) Step S910: The NWDAF provides the derived analytics to the NF, using either the Nnwdaf_AnalyticsInfo and/or Nnwdaf_AnalyticsSubscription service, depending on the service used in step S902.

(6) Step S912/S914/S916: If the NF subscribed the analytics in step S902, the NWDAF provides new analytics to the NF when it generates the new output. That is, when the NF requests continuous subscription of the analytics in step S902, the NWADF continuously provides the analytics. In this case, the analytics may be generated and provided at regular intervals, or it may be provided only when the analytics is updated by acquiring new data from the PCF.

In FIG. 9, the NWDAF has derived and provided analytics based on data related to the WLAN usage experience of the UE according to the request of the NF. However, the implementation of the present disclosure is not limited thereto, and the NWDAF may derive and provide corresponding analytics to other NFs without a separate request and/or subscription.

The service operation shown in FIGS. 8 and/or 9 may be extended and used, or other service operations (e.g., a conventional service operation and/or a new service operation) may be used.

An NF that is provided with data related to WLAN usage experience from the UE may be an NF other than the PCF. For example, the NF provided with data related to the WLAN usage experience from the UE may be the UPF and/or a new NF defined for collecting data related to WLAN usage experience. In this case, the NWDAF may request and collect data related to the WLAN usage experience from an NF that collects data related to the WLAN usage experience, instead of the PCF.

The present disclosure can have various advantageous effects.

For example, the PCF can update the WLANSP to achieve the best WLAN performance by using the new analytics related to the WLAN usage experience.

For example, the PCF can update the WLANSP to continuously reflect the actual UE's WLAN usage experience based on data related to the WLAN usage experience provided by the UE.

For example, NFs other than the PCF can also update WLAN-related configuration based on data related to the WLAN usage experience provided by the UE.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
    transmitting, to a user equipment (UE), a wireless local area network (WLAN) selection policy;
    transmitting, to a network data analytics function (NWDAF), a subscription to analytics related to a WLAN,
    wherein the subscription to the analytics related to the WLAN includes a target of analytics reporting, analytics filter information, and an analytics target period, and
    wherein the analytics filter information includes an area of interest, a service set ID (SSID), and a basic service set ID (BSSID);
    receiving, from the NWDAF, the analytics related to the WLAN in response to the subscription,
    wherein the analytics related to the WLAN includes the area of interest, and a list of analytics per SSID, and
    wherein the list of analytics per SSID includes a reference signal strength indicator (RSSI) and a number of UEs observed for the SSID; and
    updating the WLAN selection policy based on the analytics related to the WLAN.

2. The method of claim 1, wherein the method further comprises transmitting, to the UE, a configuration for collecting data related to the WLAN.

3. The method of claim 2, wherein the configuration includes at least one of a type of data to be collected by the UE, information about a time interval during which the UE collects the data, or information about when the UE transmits the collected data.

4. The method of claim 1, wherein the analytics related to the WLAN includes a correlation between the WLAN selection policy and performance of WLAN connected to the UE.

5. The method of claim 1, wherein the analytics related to the WLAN includes at least one of statistical information about past or prediction information about future.

6. The method of claim 1, wherein transmitting the subscription to the analytics related to the WLAN comprises subscribing to the analytics related to the WLAN.

7. The method of claim 1, wherein the subscription to the analytics related to the WLAN includes of an analytics identifier (ID) set to "WLAN Usage Experience" or "WLAN performance".

8. A method comprising:
    receiving a wireless local area network (WLAN) selection policy from a policy and charging function (PCF); and
    receiving an updated WLAN selection policy from the PCF,
    wherein the updated WLAN selection policy is based on analytics related to a WLAN,
    wherein the analytics related to the WLAN is notified from a network data analytics function (NWDAF) to the PCF in response to a subscription to the analytics related to the WLAN,
    wherein the subscription to the analytics related to the WLAN includes a target of analytics reporting, analytics filter information, and an analytics target period,
    wherein the analytics filter information includes an area of interest, a service set ID (SSID), and a basic service set ID (BSSID),
    wherein the analytics related to the WLAN includes the area of interest, and a list of analytics per SSID, and
    wherein the list of analytics per SSID includes a reference signal strength indicator (RSSI) and a number of user equipments (UEs) observed for the SSID.

9. The method of claim 8, wherein the method further comprises:

collecting data about WLAN usage experience; and transmitting, to the PCF or a network function (NF), the collected data about the WLAN usage experience.

10. The method of claim 9, wherein the data about the WLAN usage experience includes data related to a WLAN located in a specific area of interest and/or data related to a specific service set ID (SSID).

11. The method of claim 9, wherein the method further comprises determining when to transmit the collected data on the WLAN usage experience.

12. The method of claim 9, wherein an ID of a public land mobile network (PLMN) to which the collected data on the WLAN usage experience is to be transmitted is transmitted together with the collected data on the WLAN usage experience.

13. The method of claim 12, wherein the ID of PLMN is an ID of a PLMN that provides a WLAN selection policy applied when selecting a WLAN.

14. The method of claim 8, further comprising communicating with at least one of a mobile device, a network, or autonomous vehicle.

15. A policy and charging function (PCF) comprising:

at least one processor; and at least one memory operably connectable to the at least one processor and storing instructions that, based on being executed by the at least one processor, perform operations comprising:

transmitting, to a user equipment (UE), a wireless local area network (WLAN) selection policy;

transmitting, to a network data analytics function (NWDAF), a subscription to analytics related to a WLAN, wherein the subscription to the analytics related to the WLAN includes a target of analytics reporting, analytics filter information, and an analytics target period, and wherein the analytics filter information includes an area of interest, a service set ID (SSID), and a basic service set ID (BSSID);

receiving, from the NWDAF, the analytics related to the WLAN in response to the subscription, wherein the analytics related to the WLAN includes the area of interest, and a list of analytics per SSID, and wherein the list of analytics per SSID includes a reference signal strength indicator (RSSI) and a number of UEs observed for the SSID; and updating the WLAN selection policy based on the analytics related to the WLAN.

* * * * *